United States Patent [19]

Ladouceur

[11] Patent Number: 4,825,527

[45] Date of Patent: May 2, 1989

[54] METHOD OF ATTACHING AN ELEMENT TO A PANEL

[75] Inventor: Harold A. Ladouceur, Livonia, Mich.

[73] Assignee: Multifastener Corporation, Detroit, Mich.

[21] Appl. No.: 148,256

[22] Filed: Jan. 25, 1988

[51] Int. Cl.[4] .................. B23P 11/00; B23P 25/00
[52] U.S. Cl. ..................... 29/432; 29/458; 29/512; 403/283; 411/179; 411/180
[58] Field of Search .............. 29/432, 798, 432.2, 29/512, 458, 243.52; 411/179, 180; 403/283

[56] References Cited

U.S. PATENT DOCUMENTS

| | | |
|---|---|---|
| 521,825 | 6/1894 | Shipe ..................... 29/432 |
| 2,686,732 | 7/1954 | Montgomery et al. . |
| 2,901,099 | 7/1959 | Krieble . |
| 3,002,770 | 10/1961 | Chesnut et al. . |
| 3,620,119 | 11/1971 | King, Jr. et al. . |
| 3,634,129 | 1/1972 | Benz . |
| 3,687,493 | 8/1972 | Lock et al. . |
| 3,696,498 | 10/1972 | Leontaritis et al. . |
| 3,786,553 | 1/1974 | Ma . |
| 3,914,178 | 10/1975 | Finneran et al. . |
| 3,924,767 | 12/1975 | Arrandale et al. . |
| 3,983,304 | 9/1976 | Sekhon . |
| 4,018,257 | 4/1977 | Jack .................. 29/432 X |
| 4,064,619 | 12/1977 | Echols et al. . |
| 4,074,011 | 2/1978 | Teramae et al. . |
| 4,114,505 | 9/1978 | Loeser et al. . |
| 4,298,633 | 11/1981 | Bradlee . |
| 4,345,961 | 8/1982 | Rothwell et al. . |
| 4,362,450 | 12/1982 | Hasegawa et al. . |
| 4,430,034 | 2/1984 | Fujikawa ............ 29/432.2 UX |
| 4,459,073 | 7/1984 | Muller . |
| 4,490,904 | 1/1985 | Moyher .............. 29/432.2 X |
| 4,508,759 | 4/1985 | Wallace . |
| 4,543,701 | 10/1985 | Muller . |
| 4,555,838 | 12/1985 | Muller . |
| 4,608,742 | 9/1986 | Ferguson et al. ............. 29/458 |
| 4,610,072 | 9/1986 | Muller . |
| 4,630,362 | 12/1986 | Bauer et al. ............. 29/432.2 X |
| 4,633,560 | 1/1987 | Muller . |
| 4,654,951 | 4/1987 | Myer . |
| 4,655,169 | 4/1987 | Pullola . |
| 4,711,021 | 12/1987 | Muller . |
| 4,713,872 | 12/1987 | Muller . |

FOREIGN PATENT DOCUMENTS

| | | |
|---|---|---|
| 617081 | 3/1961 | Canada . |
| 341923 | 2/1931 | United Kingdom . |
| 811573 | 4/1959 | United Kingdom . |

Primary Examiner—Charlie T. Moon
Attorney, Agent, or Firm—Cullen, Sloman, Cantor, Grauer, Scott & Rutherford

[57] ABSTRACT

A method of attaching a self-attaching element, including a self-piercing element, to a panel in a die member. The self-attaching element includes a tubular barrel portion having a free open end and may include a piercing surface at the free end of the barrel portion. The die member includes an annular concave die cavity which surrounds a center die post. The method includes coating at least the tubular barrel portion with a fluorocarbon coating, such as polymerized tetrafluoroethylene, prior to the installation of the fastening element to the panel. The tubular barrel portion is then driven through an opening formed in the panel generally coaxially aligned with the die member center post. The opening may be preformed or more preferably pierced by the piercing surface of the barrel portion. The coated internal surface of the tubular barrel portion is then driven against the external surface of the die post, and then against the bottom surface of the concave die cavity, forming a channel-shaped end portion which receives the edge of the panel, forming a mechanical interlock. The friction-resistant fluorocarbon coating on the barrel portion significantly improves the panel installation, including the integrity of the joint, torque resistance and sealing.

8 Claims, 3 Drawing Sheets

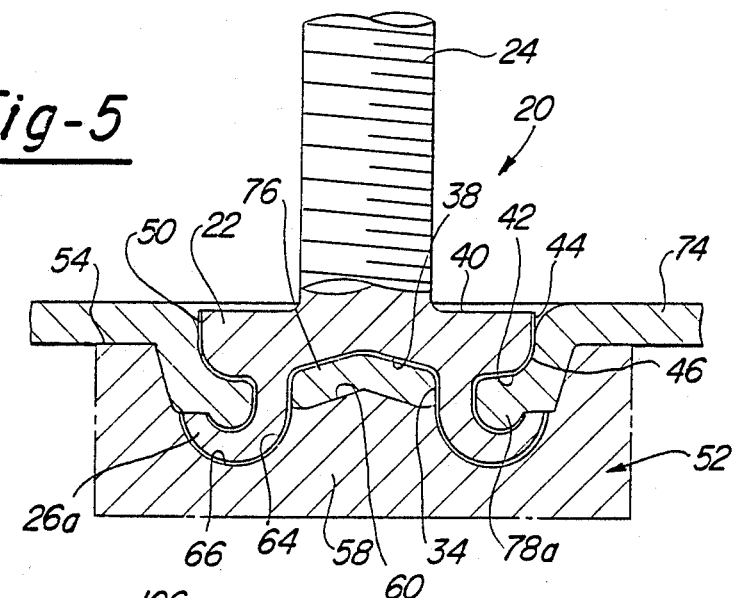
Fig-5
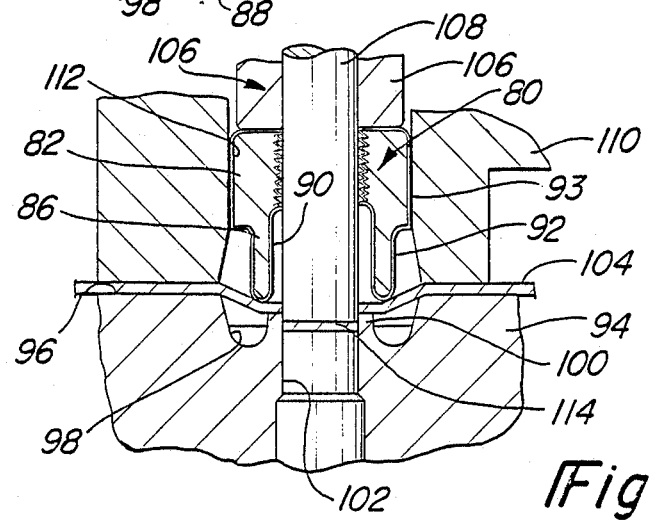
Fig-6
Fig-7

METHOD OF ATTACHING AN ELEMENT TO A PANEL

FIELD AND BACKGROUND OF THE INVENTION

The present invention relates to methods of attaching a self-attaching element to a metal panel, particularly male and female fastener elements, such as studs, nuts, and the like, wherein the self-attaching element includes an annular or tubular self-riveting barrel portion which is deformed in a die member into a channel-shape which receives and retains the panel.

A new attachment system was recently developed primarily for automotive-type applications known as the "PIERCEFORM" fastening system. This attachment system is used for permanently attaching male and female fastening elements, such as bolts and nuts, to a metal panel in a press generating several tons of installation force. The self-attaching elements include an annular or tubular barrel which preferably is pierced through the panel and received in a die member which deforms the free end of the barrel radially outwardly into a channel-shape which receives and securely retains the pierced edge of the panel. The panel may, however, be pre-pierced or simultaneously pierced during the installation by a plunger received through the barrel of a female-type fastener. The attachment system may also be used to attach other elements to a metal panel, including ball studs, closures and the like.

The "PIERCEFORM" fastening system is particularly suitable for mass production applications, such as used by the automotive and appliance industries for interconnecting structural elements requiring high integrity of the joint formed between the self-attaching element and the metal panel. The self-attaching elements may also be simultaneously attached in a die press used for forming the panel or structural element.

In the most preferred applications, the free end of the barrel is deformed radially outwardly in a U or hook-shaped channel, and the pierced edge of the panel is simultaneously deformed into the developing U-shape, preferably substantially filling the channel and forming a secure mechanical interlock. In many applications of the "PIERCEFORM" bolt, for example, the strength of the joint is greater than the pull strength of the bolt. Examples of "PIERCEFORM" installation systems are disclosed in U.S. Pat. Nos. 4,459,073, 4,543,701, 4,555,838, 4,610,072, 4,633,560, 4,711,021 and 4,713,872, all of which are assigned to the assignee of the instant application.

At present, in a typical application of the "PIERCEFORM" system, the required installation force is between about 10 and 20 tons. As will be understood, orientation of the self-attaching element and die member, and very close tolerances, are very important to achieve a good installation. The installation force, which is composed of the forces required for piercing, forming of the barrel, and setting of the panel, results in very significant friction between the barrel and the self-attaching element, the die cavity and the panel. In a typical application of the "PIERCEFORM" stud bolt, for example, the pressure between the internal surface of the tubular barrel portion and the die surfaces may be over 50 tons per square inch. The frictional force generated by this pressure sometimes results in collapse of the barrel or stud, poor or incomplete installations and stress risers or faults which significantly reduce the integrity of the joint. Various attempts have been made to solve these problems, including orientation means, close tolerances, materials and coating of the die surfaces and various coatings on the self-attaching element, including petroleum-based lubricants, including kerosene and oil, phosphating the self-attaching element with a coating of oil, molybdenum disulfide coatings and white lithium grease. Coating of the die surfaces has not been successful because the friction between the barrel and the die surfaces caused by the high contact pressures removes the lubricant after a few installations. Further, the above-referenced lubricants have not been successful because of the very high contact pressures between the fastener barrel and the die element. Thus, there is a substantial need to improve the method of installing self-riveting fasteners of the type described above which avoids the problems of barrel collapse, incomplete installations and stress risers.

SUMMARY OF THE INVENTION

The method of installing a self-riveting or self-piercing and riveting element to a panel of this invention includes coating at least the internal surface of the barrel portion with a solid fluorocarbon lubricating coating, such as polytetrafluoroethylene. The coating may be applied by spraying, coating, dipping or other conventional methods, wherein the fluorocarbon is normally suspended in a volatile carrier and cured. As described, the self-riveting element includes an annular or tubular barrel portion having internal and external surfaces and a free open end. The barrel portion is installed in a die member having an annular concave die cavity surrounding a center die post. In the preferred embodiment, the die post has an arcuate concave exterior surface which smoothly blends into a concave arcuate bottom surface of the annular die cavity. The die post has a diameter, preferably adjacent its upper end, which is generally equal to an internal diameter of the tubular barrel portion. As will be understood, the tubular barrel portion may be circular or other tubular configurations, and the mating die surfaces should conform to the shape of the tubular barrel portion.

The method of this invention then includes coating at least the internal surface of the barrel portion with a fluorocarbon coating. The method then includes driving the tubular barrel portion free end through an opening formed in the panel generally coaxially aligned with the die member center post. In the most preferred method of this invention, the free end of the barrel portion includes a piercing surface, and the panel opening is then formed by driving the piercing surface at the free end of the barrel portion against the panel to pierce the panel opening. Alternatively, the panel opening may be formed simultaneously with the installation by a ram or plunger which is received through the bore of a female-type fastener or the panel opening may be formed prior to installation, particularly with heavy gage panels.

The fluorocarbon-coated internal surface of the barrel portion is then driven against the external surface of the guide post, expanding the free end radially outwardly. The barrel is then driven against the concave bottom surface of the die cavity forming a channel-shaped end portion on the barrel portion. The panel is simultaneously driven into the channel-shaped end portion formed in the barrel, entrapping a panel portion adjacent the opening and forming a secure mechanical interlock. In the most preferred embodiment, the channel-shaped end portion formed in the barrel is generally U-shaped in cross-section, and the panel is driven into the U-shaped channel to substantially fill the channel. In the most preferred embodiment, the self-riveting element also includes a body portion having a bearing or driving wall extending transverse to the axis of the tubular barrel portion which drives the panel portion into the developing U-shaped channel at the free end of the barrel portion.

Because frictional forces are also developed between the panel portion adjacent the panel opening and the exterior surface of the tubular barrel portion as the panel portion is driven into the developing channel-shaped barrel portion, the preferred method of this invention includes coating at least the interior and exterior surfaces of the barrel portion with the fluorocarbon coating. It has been found that this method results in more complete filling of the panel in the channel-shaped end portion of the barrel, particularly where the barrel is formed into a U-shaped channel. Thus, the coating of the interior and exterior surfaces of the barrel portion of the self-fastening element results in an improved installation and reduces fastener deformation. Unexpectedly, the improved filling of the barrel channel results in improved torque resistance, although the fluorocarbon lubricant coating remains in place. Further, the resultant joint has improved sealing characteristics, which is particularly important in automotive applications, such as oil pans, gasoline tanks, and fire walls. It has been found to be more practical to coat the entire self-attaching element with the fluorocarbon coating in many applications. In such applications, the fluorocarbon coating is preferably clear or transparent because, in many fastener applications, it is important not to change the appearance of the fastener, such as where the fastener is coated with bright zinc or chrome.

The application of a thin fluorocarbon coating to the self-attaching element has also resulted in further advantages. As will be understood, the fluorocarbon coating is preferably as thin as possible to reduce the cost. In a typical application, the coating will have a thickness of between about 0.0001 and 0.0004 inches, preferably at least about 0.0002 inches. In such applications, the coating may be incomplete or include openings or spaces. It has been found that each installation of the self-attaching element will result in wiping of the fluorocarbon lubricant into the die cavity, resulting in a residue of fluorocarbon lubricant on the die surfaces. In such applications, the residue of fluorocarbon coating on the die surfaces will be sufficiently to occlude openings in the coating on the barrel portion or accommodate uncoated, self-attaching elements. Thus, it is not necessary to coat every self-riveting or self-piercing and riveting element utilizing the method of this invention.

Other advantages and meritorious features of the method of this invention will be more fully understood from the following description of the preferred embodiments, the appended claims and the drawings, a brief description of which follows.

BRIEF DESCRIPTION OF THE DRAWINGS

FIG. 5 is a side, partially cross-sectioned view of the completed installation of the stud-type fastener shown in FIG. 1;

FIG. 6 is a side, partially cross-sectional view of a nut-type fastener installed by an alternative method of this invention wherein the entire fastener is coated with a fluorocarbon coating;

FIGS. 7 and 8 are similar to FIG. 6, illustrating further steps in the method of installation of the nut-type fastener.

DESCRIPTION OF THE PREFERRED EMBODIMENTS OF THE METHOD OF THIS INVENTION

Figure 1:
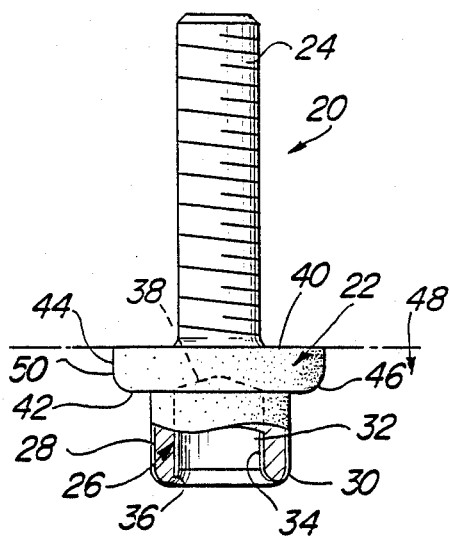
FIG. 1 is a side view, partially cross-sectioned, of a typical stud-type self-piercing and riveting element wherein the barrel portion is coated with a fluorocarbon coating.

FIG. 1 illustrates a stud-type fastener or bolt suitable for use in the method of this invention illustrated in FIGS. 2-5. Reference should also be made to U.S. Pat. No. 4,555,838, the disclosure of which is incorporated herein by reference. The stud bolt 20 illustrated in FIG. 1 includes a head or body portion 22, a threaded shank 24, and an annular or tubular barrel portion 26. As will be understood, the annular or tubular barrel portion may be cylindrical or otherwise configured to accommodate a particular application. The tubular barrel portion 26 includes an outer surface 28 and a free end 30, which is preferably arcuate to provide a drawing surface during the installation of the self-attaching element hereinbelow. The free end 30 of the barrel portion is open, and the barrel portion includes a recess or opening 32 having an internal surface 34 generally of the same configuration as the external surface 28. The free end 30 of the barrel portion in the disclosed embodiment includes a piercing surface 36, and the opening 32 in the disclosed embodiment includes a bottom wall 38.

The head or body portion 22 in the disclosed embodiment includes a top surface 40, which serves as a driven or pressing surface during the installation of the self-attaching element, the bottom surface 42, which serves as a driving surface, and a side surface 44. As will be more fully understood from the following description of the installation method, the working surfaces of the self-attaching element are preferably arcuate, such as the arcuate surface 46 joining the side surface 44 and the driving surface 42.

As disclosed more fully in the above-identified United States patent, which is assigned to the assignee of the present application, the disclosed embodiment of the stud bolt 20 is specifically designed for mass production applications wherein one or a series of self-attaching elements are attached to a metal panel, preferably in a die press generating several tons of installation force. Such presses are normally used by the automotive industry, for example, to form structural elements including frame members and body panels. The self-attaching elements may be installed in the metal panel simultaneously with the forming of the panel, wherein the installation tooling is built into the die members. In a typical application of an M6 stud for example having a 6 millimeter thread, the required installation force is about 12 tons. Further, the required installation force, which includes the forces required to pierce the panel, form the barrel portion and set the panel, as shown in FIGS. 2-5, increases with the size of the self-attaching element. An M8 stud presently requires an installation force of about 15 tons, and an M10 stud requires an installation force of about 17 tons. Where the area of the internal surface of the barrel portion is about two-tenths of a square inch, the friction generated during installation is about five times the installation force, or about 60 to 90 tons per square inch. Sparks are sometimes generated during the installation. As set forth above, the installation further requires very accurate alignment of the self-attaching fastener and the die member and the tolerances become extremely critical. These problems have resulted in collapse of the barrel portion 26, resulting in incomplete formation of the mechanical interlock between the barrel portion and the panel, collapse of the stud portion, and faults in the annular barrel portion 26 and the head or body portion 22. These faults and the incomplete formation of the mechanical interlock may result in inadequate pull-out strength for the assembly. Further, as set forth above, the torsional strength of the joint is materially adversely affected. Thus, various attempts have been made to reduce the friction, including coating the die surfaces and the self-attaching fastener. As described above, coating the die surfaces has not been successful because of the extreme frictional forces which remove the coating, and conventional coatings for the self-attaching element have been either impractical or unsuccessful. For example, a titanium carbide coating is removed in a few installations.

In accordance with the method of this invention, the critical surfaces of the self-attaching element 20 are coated with a solid fluorocarbon lubricating coating which significantly reduces the frictional forces, reduces the required installation force required for coining and eliminates the problems of barrel and stud collapse, incomplete formation of the mechanical interlock and faults in the barrel and body portions. The fluorocarbon coating also doubles the average torque resistance to turning the fastener in the panel and seals the joint. Further, as described above, the fluorocarbon coating on the self-attaching fastener is continually wiped onto the die surfaces, further reducing the likelihood of a problem. In the most preferred applications, the fluorocarbon coating is relatively thin to reduce costs and clear or transparent to avoid changing the appearance of the fastener, which may be important in certain applications.

In FIG. 1, the barrel and body portions, 26 and 22, respectively, are dipped into a fluid fluorocarbon coating material 48, providing a coating 50 which covers the bottom and side surfaces, 42 and 44, respectively, of the body portion 22 and the inside and outside surfaces 34 and 28, of the barrel portion. As will be understood more fully from the following description of the installation method shown in FIGS. 2 and 5, the inside surface 34 of the barrel portion 26 is the primary surface which must be coated with the fluorocarbon lubricating coating. A suitable fluorocarbon coating material "Tiolon A20," which is an air-drying polytetrafluoroethylene lubricant suspended in a fast-drying thermoplastic resin available from Tiodize Co., Inc. of Huntington Beach, Calif. The fluorocarbon coating may be applied to the surfaces of the self-attaching fastener subject to extreme friction by any suitable means, including dipping, as shown in FIG. 1, painting or spraying. Following application of the coating 50, the coating may be air-dried and cured, with or without heat. A suitable fluorocarbon coating has a thickness of about 0.0001 to 0.010 inches; however, the preferred thickness is 0.0002 to about 0.0004 inches. The minimum thickness of the fluorocarbon coating will depend upon the particular application and whether a coating is used on every self-attaining element. The maximum thickness of the coating is primarily cost related. Other fluorocarbon coatings may also be utilized. As will be understood, the thickness of the coating 50 has been exaggerated in the drawings.

Following coating of the critical surfaces of the self-attaching element 20, the element may be installed by the method illustrated in FIGS. 2-5. The installation apparatus includes a die member 52 having a panel-supporting surface 54 surrounding an annular die cavity 56 which surrounds a center die post 58. In the disclosed embodiment of the die member, the center die post 58 includes a conical top surface 60 surrounded by a piercing edge 62 and including a radially outwardly curving outer surface 64 which blends into the arcuate bottom surface 66 of the die cavity. The plunger or ram 68 includes an opening 70 which receives the shank 24 of the self-attaching element and a bottom surface 72 which bears against the driven surface of the body portion 22 of the self-attaching element.

Figure 2:
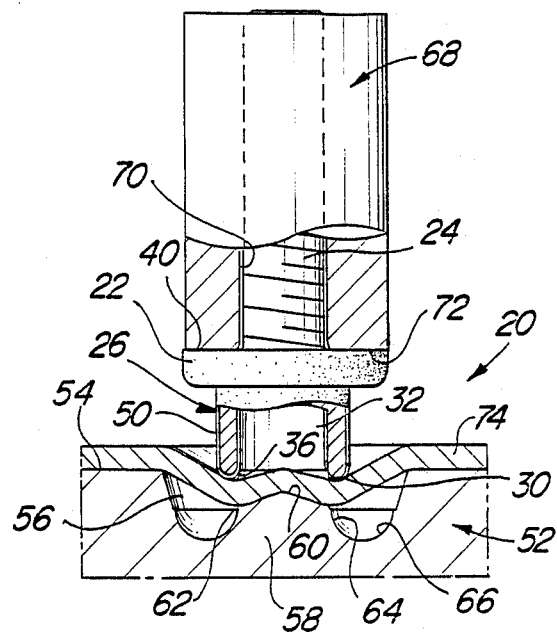
FIG. 2 is a side view of the stud fastener shown in FIG. 1 during the installation of the stud fastener in a panel, prior to piercing the panel.
Figure 3:
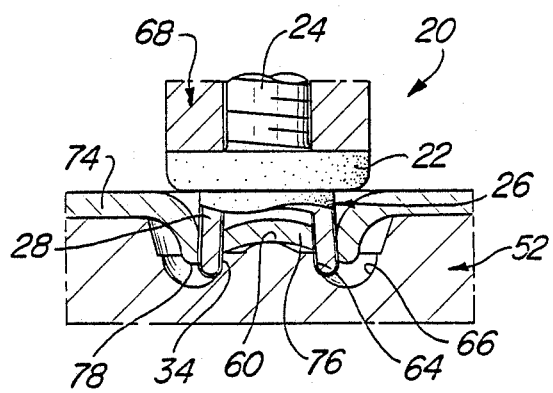
FIGS. 3 and 4 illustrate the sequence of the installation method of the embodiment of the stud-type fastener shown in FIG. 1.

As described more fully in the above-reference United States patent, the plunger 68 is reciprocal relative to the die member 52, and a panel 74 is supported in fixed relation on the panel-supporting surface 54 which preferably surrounds the die cavity 56. During the installation, the free end 30 of the barrel portion 26 is first driven against the panel by the plunger 68, driving the panel 74 into the die cavity 56 against the conical surface 60 of the center post 58, as shown in FIG. 2. The panel 74 is then pierced by the piercing surface 36 at the free end 30 of the barrel portion in cooperation with the circular piercing edge 62 of the die post, forming a panel slug 76 which is received and supported upon the top surface 60 of the die post, within the opening 32 in the barrel portion, as shown in FIG. 3. The inner surface 34 is simultaneously received against the external surface 64 of the center die post, enlarging the free end of the tubular barrel portion, and the panel portion 78 adjacent the pierced panel edge is driven against the outer surface 28 of the barrel portion, as shown in FIG. 3.

Figure 4:
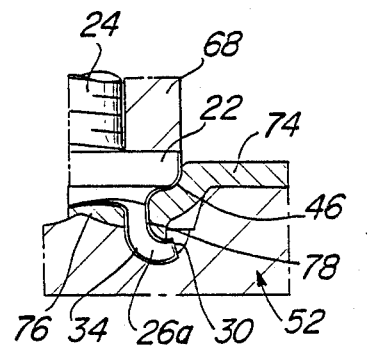

As the barrel portion is further driven into the die cavity, the free end 30 is deformed radially outwardly against the outer surface 64 of the center post and the bottom surface 66 of the die cavity into a generally hook-shaped configuration, as shown in FIG. 4. Further, the panel portion 78 is simultaneously deformed into the developing hook-shaped end portion 26a of the barrel portion by the arcuate surface 46 of the body portion 22. FIGS. 3 and 4 illustrate the coining of the free end of the barrel portion. As will now be understood, the axial force provided by the plunger 68 is resisted by the friction of the inner surface 34 of the barrel portion against the exterior surface 64 of the center post and bottom die surface 66, which is increased by the hoop stress of the annular barrel portion. As described above, the frictional force resisting the intended deformation of the barrel portion, is sufficient to result in barrel collapse; however, in the method of this invention, the internal surface 34 of the barrel portion is coated with a fluorocarbon coating 50 which significantly reduces the frictional resistance and the required installation force, eliminating the problems described hereinabove.

Continued driving of the self-attaching element 20 by the plunger 68 completes the installation, as shown in FIG. 5, wherein the barrel portion has been deformed into a U-shaped cross-section 26a, and the panel portion has been deformed into and substantially completely fills the channel 26a, as shown at 78a. Where the external surface of the barrel portion has been coated with a fluorocarbon coating, the filling of the channel-shaped barrel portion 26a is substantially complete, as shown in FIG. 5. However, where the barrel portion has not been coated, the panel may not completely fill the channel-shaped barrel. Further, the driving surface 42 of the body portion is driven against the panel portion 78a, locking the panel portion 78a in the channel-shaped barrel portion 26a, forming a very secure mechanical interlock. Testing has shown that the fluorocarbon coating does not materially adversely affect the pull-out strength of the self-attaching element 20, but materially improves the integrity of the joint, as described above. Finally, the fluorocarbon coating is wiped onto the die surfaces with each installation, eliminating the problem of occlusions in the fluorocarbon coating and eliminating the requirement to coat every self-attaching element.

FIGS. 6-9 illustrate the method of this invention utilizing a nut-type self-attaching element. Reference should be made to U.S. Pat. No. 4,610,072, assigned to the assignee of the present application, the disclosure of which is incorporated herein by reference. As shown in FIGS. 6-9, the nut-type self-attaching element 80 includes a body portion 82 having a threaded bore 84, a concentric barrel portion 86 having a free open end 88, and internal and external surfaces, 90 and 92, respectively. Prior to installation, the surfaces of the nut-type fastener 80 were coated with a fluorocarbon coating 93 by dipping the entire self-attaching element in a fluid fluorocarbon material having a volatile carrier, as described above. Following drying and curing of the fluorocarbon coating, the fastener is installed as shown in FIGS. 6-9. As shown, the nut-type self-attaching element is installed in a die member 94 having a panel-supporting surface 96 surrounding an annular die cavity 98 which surrounds a center die post 100 having an axial bore 102 coaxially aligned with the bore 84 of the nut-type fastener 80. A panel 104 is supported in fixed relation on the panel-supporting surface 96 of the die member. The nut-type fastener 80 is driven downwardly by a plunger 106, and a punch or ram 108 is received through the nut bore to pierce the panel, as described below. The nut, punch and plunger are supported in a nose member 110 having an opening or bore 112 which receives the nut-type self-attaching element 80 therethrough and which fixes the panel 104 on the panel-supporting surface 96.

Figure 8:
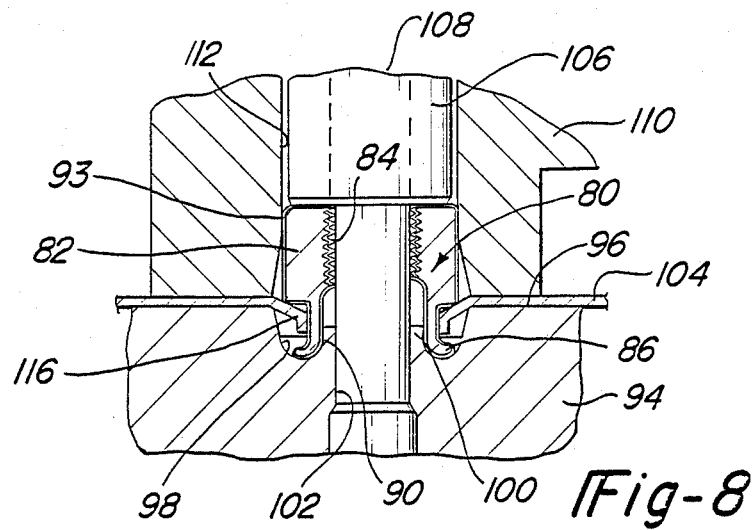
Figure 9:
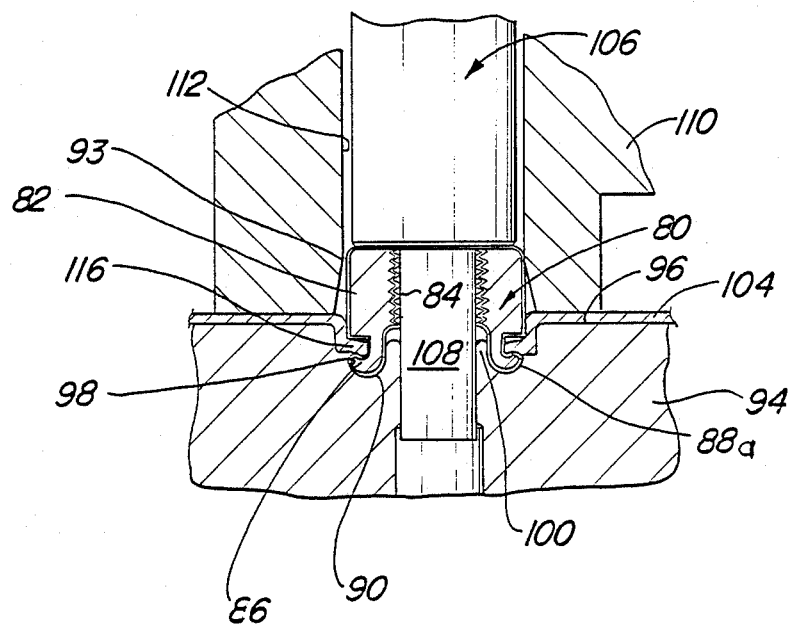
FIG. 9 is a side, cross-sectional view illustrating the completed installation of the nut-type fastener shown in FIGS. 6 and 7.

During installation, the punch 108 is first driven downwardly, as shown in FIG. 6, to drive the panel into the die opening against the upper surface of the center post 100, preloading the panel, as shown in FIG. 6. The punch 108 then pierces a slug 114 from the panel, which is received through the die bore 102, as shown in FIG. 7. The plunger 106 then drives the free end 88 of the self-attaching element against the arcuate external surface of the center die post 100 and into the arcuate concave surface of the annular die cavity 98, deforming the free end 88a of the barrel portion radially outwardly and the panel portion 116 against the external surface 92 of the barrel portion, as shown in FIG. 8. As described above, the axial installation force generated by the plunger 106 is resisted by the frictional forces, resultig in the problems described. In the disclosed embodiment of the method, however, the surfaces of the self-attaching element 80 are coated with a fluorocarbon coating 93 which eliminates these problems and further coats the die surfaces, resulting in a secure installation, as shown in FIG. 9.

The installation shown in FIGS. 6-9 differs from the installation shown in FIGS. 2-5 in that the free end 88 of the barrel portion of the nut-type fastener 80 does not pierce the panel. Instead, the panel is pierced during the installation by the punch 108. Alternatively, the panel opening may be pierced prior to installation of the nut or stud-type fasteners disclosed therein. However, this method eliminates an important advantage of the disclosed installation methods.

As will now be understood, the coating of at least the internal surface of the barrel portion, or preferably the internal and external surfaces of the barrel portion, with a relatively thin fluorocarbon coating, preferably at least about 0.0002 inches, results in a significant improvement in the method of installing a self-attaching element of the type disclosed herein. The improved method includes first coating the critical surfaces of the tubular barrel portion with a fluorocarbon coating. Then, the tubular barrel portion free end is driven through an opening formed in the panel generally coaxially aligned with the die member center post. As described, the panel opening is preferably formed during the installation of the self-attaching element, either by piercing the panel with a piercing surface at the free end of the barrel portion with a stud-type fastener, or the panel is pierced with a punch through the bore of a nut-type fastener. The coated internal surface of the tubular barrel portion is then driven against the external surface of the die post, expanding the free end of the tubular barrel portion, and then against the bottom surface of the concave die cavity, permanently deforming the free of the barrel portion into a channel shape. In the most preferred method, the free end of the barrel is deformed into a U-shaped cross-section opening toward the body portion of the self-attaching element, and the body portion includes a driving surface which extends generally transversely to the tubular barrel portion, securely entrapping the panel portion and forming a very secure installation. Further the panel is driven into the developing channel shape of the barrel portion, preferably filling the channel. Thus, the exterior surface of the barrel portion is also preferably coated with the fluorocarbon coating to assure substantially complete filling of the channel. This method reduces the required coining force and significantly improves the integrity of the resultant joint between the self-attaching element and the panel, as described above. Unexpectedly, the coating actually improves the torque resistance of the attachment and improves sealing.

The self-attaching element and the panel are formed of plasticly-deformable materials, preferably steel. A suitable material for the self-attaching elements disclosed herein is a medium carbon steel, such as SAE 1035 or 10B35 steel. In a typical automotive application, the self-attaching element is attached to a low-carbon steel or a low-carbon deep draw steel having a thickness between about 0.025 to 0.125 inches; however, the self-attaching element may also be attached to other plasticly-deformable materials, including aluminum, aluminum-coated steels or galvanized steel where friction is very high and welding techniques cannot be used. Where the self-attaching element is formed from a ferrous materal, such as medium carbon steel, it may be also be preferable to apply an initial coating to the element, prior to the application of the fluorocarbon coating for rust resistance, bonding agents for painting, etc. Suitable coatings are zinc phosphate, zinc phosphate and oil, bright zinc and chrome. Other details of the preferred self-attaching elements, installation apparatus and methods of installation may be found in the above-identified United States patents assigned to the assignee of the instant application.

I claim:

1. A method of permanently attaching a self-riveting element to a panel in a die member, said self-riveting element having an integral tubular barrel portion, said tubular barrel portion having internal and external surfaces and a free open end, said die member having an annular concave die cavity surrounding a center die post, said center die post having an external surface blending into a bottom surface of said concave annular die cavity and said die post having an external diameter generally equal to an internal diameter of said tubular barrel portion internal surface, said method comprising the following steps:
   (a) coating at least said tubular barrel portion internal surface with a solid fluorocarbon lubricating coating;
   (b) driving said tubular barrel portion free end through an opening formed in said panel, said opening generally coaxially aligned with said die member center post; and
   (c) driving said coated tubular barrel portion internal surface against said die post external surface and then against said concave die cavity bottom surface, thereby permanently expanding said barrel portion free end and forming a channelshaped end portion, said channel-shaped end portion entrapping a panel portion adjacent said panel opening and forming a mechanical interlock between said tubular barrel portion and said panel.

2. The method of permanently attaching a self-riveting element to a panel as defined in claim 1, characterized in that self-attaching element includes a body portion integral with said barrel portion, said body portion having a driving surface extending generally transversely to said tubular barrel portion, said method including coating said internal and external surfaces of said tubular barrel portion with said fluorocarbon coating, and driving said body portion driving surface against said panel portion, thereby driving said panel portion against said tubular barrel portion external surface into said tubular barrel portion channel-shaped end portion, entrapping said panel portion.

3. The method of permanently attaching a self-riveting element to a panel as defined in claim 1, characterized in that said barrel portion free end includes a piercing surface, said method including coating at least said external and internal surfaces of said tubular barrel portion with said fluorocarbon coating, driving said barrel portion piercing surface against said panel to pierce said panel opening, and driving said tubular barrel portion through said pierced opening forming said channelshaped end portion and forming said mechanical interlock.

4. The method of permanently attaching a self-riveting element to a panel as defined in claim 1, wherein said self-riveting element includes a body portion integral with said tubular barrel portion, said body portion including means for attaching said element to a structural member and said method including coating the exterior surfaces of said self-riveting element and body portion with said fluorocarbon coating.

5. A method of permanently attaching a self-riveting element to a panel in a die member, said self-riveting element having a body portion and an integral tubular barrel portion, said body portion having an external diameter greater than an external diameter of said tubular barrel portion defining a bearing surface extending generally transverse to said tubular barrel portion, said barrel portion havinginternal and external surfaces and a free open end, said die member having an annular concave die cavity surrounding a center die post, said center die post having an arcuate concave exterior surface blending into a concave arcuate bottom surface of said annular die cavity, said center die post exterior surface having a diameter generally equal to an internal diameter of said tubular barrel portion, said method comprising the following steps:
   (a) coating at least said internal and external surfaces of said tubular barrel portion with a fluorocarbon coating;
   (b) driving said tubular barrel portion free end through an opening formed in said panel, said opening generally coaxially aligned with said die member center post; and
   (c) driving said coated tubular barrel portion internal surface against said center die post arcuate concave exterior surface permanently expanding said barrel portion free end to conform to said die post arcuate concave exterior surface and then driving said barrel portion internal surface against said die cavity concave arcuate bottom surface, thereby forming a channel-shaped end portion, and simultaneously driving said body portion bearing surface against a panel portion adjacent said panel opening, thereby driving said panel portion against said tubular barrel portion exterior surface into said channel-shaped end portion, entrapping said panel portion.

6. The method of attaching a self-riveting element to a panel as defined in claim 5, characterized in that said panel portion free end includes a piercing surface, said method including coating said self-riveting element body and barrel portions with said fluorocarbon coating, driving said barrel portion piercing surface against said panel to pierce said opening, and driving said tubular barrel portion through said pierced panel opening, forming said channel-shaped end portion and forming said mechanical interlock.

7. A method of attaching a self-piercing and riveting element to a panel in a die member, said self-piercing and riveting element having a tubular barrel portion, said tubular barrel portion having internal and external surfaces and a free end having an opening therethrough and said free end having a piercing surface, said die member having an annular concave die cavity surrounding a center die post, said center die post having an external surface expanding in diameter and blending into a bottom surface of said concave annular die cavity, and said die post having a minor external diameter generally equal to an internal diameter of said tubular barrel portion internal surface, said method comprising the following steps:
- (a) coating at least said tubular barrel portion internal and external surfaces with a fluorocarbon coating;
- (b) supporting said panel on said die member overlying said die cavity;
- (c) generally coaxially aligning said tubular barrel portion and said die member die post and driving said piercing surface against said panel to pierce an opening through said panel generally coaxially aligned with said die member center die post;
- (d) driving said tubular barrel portion through said pierced panel opening and telescopically receiving said center die post in said open end of said tubular barrel portion, said center die post external surface receiving said barrel portion internal surface and permanently expanding said tubular barrel portion free end; and
- (e) continuing to drive said tubular barrel portion into said die cavity, said die cavity bottom surface deforming said tubular barrel portion free end radially outwardly and forming a channel-shaped end portion generally U-shaped in crosssection, said channel-shaped end portion entrapping a panel portion adjacent said pierced panel opening and forming a mechanical interlock between said channel-shaped end portion said panel portion.

8. The method of attaching a self-piercing and riveting element to a panel as defined in claim 7, characterized in that self-piercing and riveting element includes a body portion integral with said tubular barrel portion, said body portion having an external diameter greater than said tubular barrel portion and defining a bearing surface extending generally transverse to said tubular barrel portion, said method including coating said body and barrel portions with said fluorocarbon coating, driving said body portion bearing surface against said panel portion, thereby entrapping said panel portion between said body portion bearing surface and said channel-shaped end portion of said barrel portion.

* * * * *